(12) United States Patent
Lee et al.

(10) Patent No.: US 11,025,866 B2
(45) Date of Patent: Jun. 1, 2021

(54) NETWORK SEPARATION DEVICE AND VIDEO SURVEILLANCE SYSTEM EMPLOYING THE SAME

(71) Applicant: GL D&IF Inc., Seongnam-si (KR)

(72) Inventors: Jee Hwan Lee, Gyeonggi-do (KR); Su-Hee Jang, Gyeonggi-do (KR)

(73) Assignee: GL D&IF Inc., Gyeonggi-do (KR)

( * ) Notice: Subject to any disclaimer, the term of this patent is extended or adjusted under 35 U.S.C. 154(b) by 0 days.

(21) Appl. No.: 16/318,795

(22) PCT Filed: Jul. 21, 2017

(86) PCT No.: PCT/KR2017/007920
§ 371 (c)(1),
(2) Date: Jan. 18, 2019

(87) PCT Pub. No.: WO2018/016925
PCT Pub. Date: Jan. 25, 2018

(65) Prior Publication Data
US 2019/0289261 A1  Sep. 19, 2019

(30) Foreign Application Priority Data

Jul. 21, 2016  (KR) ........................ 10-2016-0092927

(51) Int. Cl.
*H04N 7/18* (2006.01)
*H04N 5/278* (2006.01)
*H04L 29/06* (2006.01)

(52) U.S. Cl.
CPC ......... *H04N 7/181* (2013.01); *H04L 63/0209* (2013.01); *H04L 65/4015* (2013.01); *H04L 65/4069* (2013.01); *H04N 5/278* (2013.01)

(58) Field of Classification Search
CPC ............. H04L 63/0209; H04L 65/4015; H04L 65/4069; H04N 5/278; H04N 7/181
See application file for complete search history.

(56) References Cited

U.S. PATENT DOCUMENTS

| 2004/0119814 A1* | 6/2004 | Clisham | ................. | H04N 7/141 348/14.08 |
| 2014/0075535 A1* | 3/2014 | Soffer | .................. | H04L 65/605 726/13 |

(Continued)

FOREIGN PATENT DOCUMENTS

| KR | 10-2005-0104455 A | 11/2005 |
| KR | 10-2011-0088981 A | 8/2011 |

(Continued)

*Primary Examiner* — Farzana Hossain
(74) *Attorney, Agent, or Firm* — IP Legal Services, LLC

(57) ABSTRACT

A network separation device that can separate an internal network and an external network with little changes in the networks in a video surveillance system providing monitoring picture data through the internal network and the external network. The network separation device receives monitoring picture data from a monitoring camera that acquires a monitoring picture, transmits outbound picture data unidirectionally to an external network client through an external network in response to a request of the external network client, and transmits inbound picture data to an internal network client through an internal network in response to another request from of the internal network client. The network separation device includes: a raw data extraction unit configured to receive the monitoring picture data and extract raw picture data from the monitoring picture data; a unidirectional data generation unit configured to receive the raw picture data and generate a unidirectional data by controlling a data flow of the raw picture data such that the raw picture data is transferred in one predetermined direction only; a first picture data generator configured to generate the outbound picture data by encoding the unidirectional data according to a first coding scheme; and a second picture data generator configured to generate the inbound picture data by encoding the unidirectional data according to a second coding scheme.

7 Claims, 6 Drawing Sheets

(56) References Cited

U.S. PATENT DOCUMENTS

2014/0164921 A1    6/2014  Salinas
2016/0374053 A1   12/2016  Hareuveni et al.

FOREIGN PATENT DOCUMENTS

| KR | 10-1327427 B1 | 11/2013 |
| KR | 10-2014-0100452 A | 8/2014 |
| KR | 10-1449452 B1 | 10/2014 |
| KR | 10-1513268 B1 | 4/2015 |
| KR | 10-1562870 B1 | 10/2015 |
| KR | 10-1623920 B1 | 5/2016 |
| KR | 10-2016-0114122 A | 10/2016 |

\* cited by examiner

NETWORK SEPARATION DEVICE AND VIDEO SURVEILLANCE SYSTEM EMPLOYING THE SAME

CROSS REFERENCE TO RELATED APPLICATIONS

This application is a National Stage Patent Application of PCT International Patent Application No. PCT/KR2017/007920 (filed on Jul. 21, 2017) under 35 U.S.C. § 371, which claims priority to Korean Patent Application No. 10-2016-0092927 (filed on Jul. 21, 2016), the teachings of which are incorporated herein in their entireties by reference.

TECHNICAL FIELD

The present disclosure relates to a network separation system and, more particularly, to a network separation device that separates a network into an internal network and an external network. Additionally, the present disclosure relates to a video surveillance system that may be implemented using the network separation device.

BACKGROUND ART

Computer networks are widely being used owing to rapid developments of computer and communication technologies. Particularly, in government offices and corporate buildings, an internal network (e.g. intranet) is being used along with an external network (e.g., Internet) for searching information, transmitting and receiving data, and sending and receiving e-mails. In such a system that the internal network is mixedly used with the external network which is vulnerable to an external attack, a person with a malicious intent such as a hacker may access the internal network via the external network to steal or damage important information or files. Accordingly, needed are technologies for protecting the important internal information from an attack of the hacker intruding through the external network. However, it is difficult to perfectly protect the important internal information from a bypass attack of the intruder by using only conventional security schemes such as a firewall.

On the other hand, the installation of a real-time video surveillance system based on monitoring cameras is rapidly expanding to prepare for an emergency such as a unauthorized intrusion of an outsider, theft, terror, kidnapping, and setting fire to important facilities. The monitoring camera, which traditionally has been interfaced with nearby devices only, is in a transition into an IP camera that is capable of sending a monitoring picture to a user computer or smartphone in a remote place through a network. Such an IP camera, however, may be more vulnerable to various hacking trials, and may face security issues such as stealing of monitoring pictures and disabling the camera by replacing the monitoring pictures with another ones.

Furthermore, some of the cameras operated by government offices or corporate buildings provide the monitoring pictures to remote terminals through the external network in addition to nearby clients. For instance, a monitoring picture acquired by a camera operated by a local government may be provided not only to those involved in tasks related with the monitoring picture but also to, for example, an external disaster prevention government office so that the office can use the monitoring picture in forecasting a nationwide disaster occurrence. The problem of a potential hacker intrusion through the external network may also exist in the video surveillance system that provides the monitoring picture through both the internal network and the external network. In detail, the hacker may try to steal the monitoring picture or disable the video surveillance system as well as to steal or damage important information or files by accessing the internal network through the external network.

To prevent such an attack through the external network, efforts are being made to develop a network separation technology that isolates the internal network from the external network. The network separation technology separates a network into two or more networks to block transmission and receipt of data to and from another network, so that a situation of being vulnerable to a security threat in one of the networks is not spread to the other networks, and be categorized into a physical network separation and a logical network separation.

The physical network separation, which provides all the devices such as a network equipment and personal computers separately for the internal network and the external network, has the problems of consuming too much space and incurring much expenses. On the other hand, the logical network separation, which is influenced by an operating system (OS) of a server or a client computer, may show frequent failure occurrences due to changes of the operating system. Furthermore, the logical network separation requires continued updates of a program in use according to changes in program environments, which increases conveniences of users and reduces working efficiencies.

SUMMARY OF DISCLOSURE

Technical Problem

To solve the problems, provided is a network separation device that can separate an internal network and an external network with little changes in the networks in a video surveillance system providing monitoring picture data through the internal network and the external network.

Also, provided is a video surveillance monitoring system that can provide the monitoring picture data through the internal network and external network, ensures a separation of the internal network and the external network with little changes in the networks, and minimize the cost required for the separation.

Solution to Problem

According to an aspect of an exemplary embodiment, provided is a network separation device receiving monitoring picture data from a monitoring camera that acquires a monitoring picture, transmitting outbound picture data unidirectionally to an external network client through an external network in response to a request of the external network client, and transmitting inbound picture data to an internal network client through an internal network in response to another request from of the internal network client. The network separation device includes: a raw data extraction unit configured to receive the monitoring picture data and extract raw picture data from the monitoring picture data; a unidirectional data generation unit configured to receive the raw picture data and generate a unidirectional data by controlling a data flow of the raw picture data such that the raw picture data is transferred in one predetermined direction only; a first picture data generator configured to generate the outbound picture data by encoding the unidirectional data according to a first coding scheme; and a second picture data generator configured to generate the inbound picture data by encoding the unidirectional data according to a second coding scheme.

The network separation device may further include a picture storage configured to store the inbound picture data. The inbound picture data stored in the picture storage may be transmitted to the internal network client.

The network separation device may further include a subtitle inserter configured to insert a subtitle into at least one of an outbound picture corresponding to the outbound picture data or an inbound picture corresponding to the inbound picture data.

The subtitle inserter may include: a first subtitle inserter configured to insert a first subtitle into the outbound picture; and a second subtitle inserter configured to insert a second subtitle into the inbound picture. The first subtitle may be different from the second subtitle.

The first coding scheme may be the same as the second coding scheme.

The network separation device may further include a first packetizer configured to packetize the outbound picture data according to a first streaming scheme to transmit to the external network client by streaming. Also, the network separation device may further include a second packetizer configured to packetize the inbound picture data according to a second streaming scheme to transmit to the internal network client by streaming. The first streaming scheme may be different from the second streaming scheme.

In an exemplary embodiment, the raw data extraction unit may receive the monitoring picture data in a form of a stream in which the monitoring picture data is packetized according to the second streaming scheme and depacketize the stream to extract the raw picture data. Also, the first packetizer may packetize the outbound picture data according to the first streaming scheme. In such a case, the network separation device changes a streaming scheme of the monitoring picture data from the second streaming scheme to transmit to the first streaming scheme.

The network separation device may further include a traffic detection unit configured to detect an outbound traffic that increases with a number of the external network clients receiving the outbound picture data.

The network separation device is capable of being interfaced to a camera selected from a plurality of monitoring cameras. The selected camera interfaced to the network separation device may be subject to a change according to the outbound traffic.

The network separation device may further include an input selection unit configured to change the selected camera interfaced to the network separation according to the outbound traffic.

The network separation device may further include a control command checking unit configured to check a command received from the external network client to allow the command to be executed only when the command conforms to a prescribed rule.

The network separation device may further include an initialization unit configured to initialize and clear the network separation device when a predetermined abnormal state occurs in a video surveillance system.

According to an aspect of an exemplary embodiment, provided is a video surveillance system transmitting outbound picture data corresponding to a monitoring picture unidirectionally to an external network client through an external network in response to a request of the external network client and transmitting inbound picture data corresponding to the monitoring picture to an internal network client through an internal network in response to another request from of the internal network client. The video surveillance system includes: a monitoring camera configured to acquire the monitoring picture and output the monitoring picture data representing the monitoring picture, and a network separation device configured to extract raw picture data from the monitoring picture data, generate a unidirectional data by controlling a data flow of the raw picture data such that the raw picture data is transferred in one predetermined direction only, generate the outbound picture data by encoding the unidirectional data according to a first coding scheme, and generate the inbound picture data by encoding the unidirectional data according to a second coding scheme.

The network separation device may further include a picture storage configured to store the inbound picture data. The inbound picture data stored in the picture storage may be transmitted to the internal network client.

The network separation device may further include a subtitle inserter configured to insert a subtitle into at least one of an outbound picture corresponding to the outbound picture data or an inbound picture corresponding to the inbound picture data.

The subtitle inserter may include: a first subtitle inserter configured to insert a first subtitle into the outbound picture; and a second subtitle inserter configured to insert a second subtitle into the inbound picture. The first subtitle may be different from the second subtitle.

The first coding scheme may be the same as the second coding scheme.

The network separation device may further include a first packetizer configured to packetize the outbound picture data according to a first streaming scheme to transmit to the external network client by streaming. Also, the network separation device may further include a second packetizer configured to packetize the inbound picture data according to a second streaming scheme to transmit to the internal network client by streaming. The first streaming scheme may be different from the second streaming scheme.

In an exemplary embodiment, the raw data extraction unit may receive the monitoring picture data in a form of a stream in which the monitoring picture data is packetized according to the second streaming scheme and depacketize the stream to extract the raw picture data. Also, the first packetizer may packetize the outbound picture data according to the first streaming scheme. In such a case, the network separation device changes a streaming scheme of the monitoring picture data from the second streaming scheme to transmit to the first streaming scheme.

The network separation device may further include a traffic detection unit configured to detect an outbound traffic that increases with a number of the external network clients receiving the outbound picture data.

The network separation device is capable of being interfaced to a camera selected from a plurality of monitoring cameras. The selected camera interfaced to the network separation device may be subject to a change according to the outbound traffic.

The network separation device may further include an input selection unit configured to change the selected camera interfaced to the network separation according to the outbound traffic.

The network separation device may further include a control command checking unit configured to check a command received from the external network client to allow the command to be executed only when the command conforms to a prescribed rule. The control command checking unit may be provided inside the network separation device, or outside the network separation device in the video surveillance system.

The network separation device may further include an initialization unit configured to initialize and clear the network separation device when a predetermined abnormal state occurs in the video surveillance system.

Advantageous Effects

According to the present disclosure, the internal network and external network can be separated, with little changes in the networks, by using only the network separation device in the video surveillance system providing the monitoring picture data through the internal network and the external network. The network separation device ensures the network separation to an extent of the physical network separation system through a data processing including data passing which is a unidirectional process, encoding, and decoding.

Therefore, present disclosure can protect the monitoring camera and the monitoring picture when there is an attack attempt such as a unauthorized adjustment of the monitoring camera and stealing of the monitoring picture and can block an intrusion into the internal network through the network separation device.

The present disclosure can maximize a separation effect and improve a work efficiency while minimizing costs required for the network separation because of little changes in the network environment.

BRIEF DESCRIPTION OF DRAWINGS

Hereafter, the ideal embodiments of the present disclosure will be explained in detail by referring to the attached drawings, wherein the same or corresponding material will be given the same reference numeral. Among the drawings.

DESCRIPTION OF EMBODIMENTS

Figure 1:
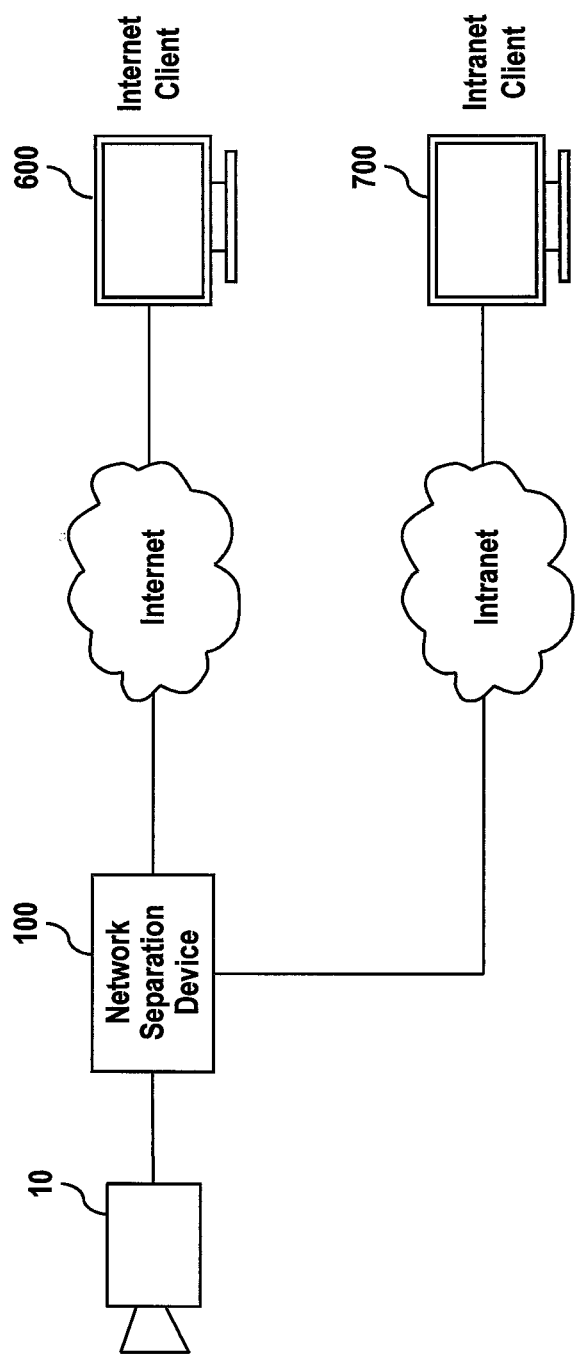
FIG. 1 is a schematic block diagram of a video surveillance system according to an exemplary embodiment of the present disclosure.

Referring to FIG. 1, a video surveillance system according to an exemplary embodiment of the present disclosure includes a monitoring camera 10 and a network separation device 10 and is capable of providing a monitoring picture acquired by the monitoring camera 10 to at least one Internet client 600 through an external network such as Internet while providing the monitoring picture to at least one intranet client 700 through an intranet.

The monitoring camera 10 is installed at a place that needs video surveillance for security. In an exemplary embodiment, the monitoring camera 10 is an Internet protocol (IP) camera that can output monitoring picture data in accordance with Internet protocol, but the present disclosure is not limited thereto.

The network separation device 100 receives the monitoring picture data from the monitoring camera 10 to provide the monitoring picture data to the Internet client 600 through the Internet and to the intranet client 700 through the intranet. In a preferred embodiment, the network separation device 100 provides the picture data to the Internet client 600 through the Internet based on a request from the Internet client 600. The video surveillance system may include a server such as a web server (not shown) connected to the Internet to receive the request from the Internet client 600 and respond to the request. The network separation device 100 may be connected to the Internet through the web server. The web server may provide contents to the Internet client 600 in a form of a web page, for example, analyze the request from the Internet client 600 to transfer an analyzed request to the network separation device 100, and transmit data generated by the network separation device 100 to the Internet client 600. The description of the server such as the web server or any equivalent network elements that receives the request from the Internet client 600 and sends the monitoring picture data to the Internet client 600 will be omitted for simplicity.

When providing the monitoring picture data to the Internet client 600 through the Internet, the network separation device 100 controls data flow in a channel so that the monitoring picture data is transferred unidirectionally, i.e. only in a direction from the network separation device 100 to the Internet client 600. On the other hand, the network separation device 100 does not perform the unidirectional data flow control when providing the monitoring picture data to the intranet client 700 through the intranet.

Even though the Internet is shown as an example of the external network in FIG. 1, the external network is not limited thereto but may include at least one of various types of wired or wireless networks such as a local area network (LAN), a wide area network (WAN), a value-added network (VAN), a personal area network (PAN), a mobile radio communications network, a wireless broadband Internet (Wibro), a mobile Worldwide Interoperability for Microwave Access (WiMAX) network, a High Speed Downlink Packet Access (HSDPA) network, and a satellite communications network. In addition, even though only a single external network is shown in FIG. 1, the network separation device 100 of the video surveillance system may be connected to two or more external networks.

Figure 2:
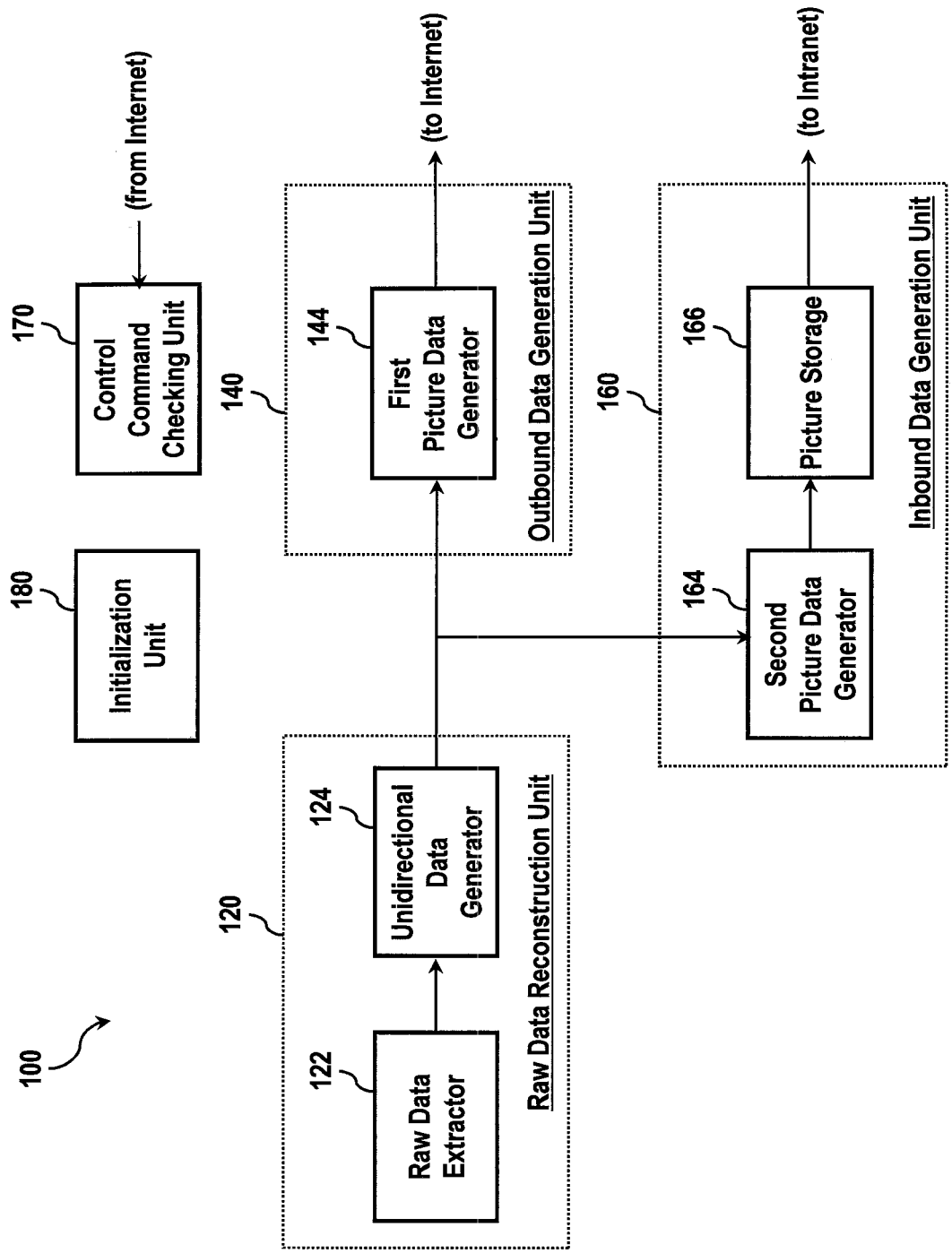
FIG. 2 is a block diagram of a network separation device shown in FIG. 1 according to an embodiment of the present disclosure.

FIG. 2 illustrates an example of the network separation device 100.

Referring to FIG. 2, the network separation device 100 may include a raw data reconstruction unit 120, an outbound data generation unit 140, an inbound data generation unit 160, a control command checking unit 170, and an initialization unit 180. The raw data reconstruction unit 120 receives the monitoring picture data from the monitoring camera 10 and extracts raw data from the monitoring picture data. The outbound data generation unit 140 receives the raw data from the raw data reconstruction unit 120 and generates outbound picture data in a format suitable for providing to the Internet client 600 through the Internet to provide the outbound picture data to the Internet client 600. The inbound data generation unit 160 receives the raw data from the raw data reconstruction unit 120 and generates inbound picture data in a format suitable for providing to the intranet client 700 through the intranet to provide the inbound picture data to the intranet client 700.

The raw data reconstruction unit 120 may include a raw data extractor 122 configured to decode the monitoring picture data to extract the raw data and a unidirectional data generator 124 configured to receive the raw data extracted by the raw data extractor 122 and generate a unidirectional picture data by controlling the data flow in such a way that the raw data flows in a prescribed single direction. The flow of the raw data may be controlled in the form of serial data or parallel data in the unidirectional data generator 124 such that the raw data can be transferred unidirectionally. Even though not shown in the drawing, the raw data reconstruction unit 120 may further include a light emitting diode (LED) configured to indicate an operational state of the network separation device 100 or the raw data reconstruction unit 120 and a power supply configured to supply power to the components in the unit. In case that a plurality of monitoring cameras 10 are provided in the system of FIG. 1, a plurality of raw data extraction units 122 which are decoders may be prepared such that each of the plurality of raw data extraction units 122 corresponds to respective one of the plurality of monitoring cameras 10.

In an exemplary embodiment, the monitoring picture data received by the raw data extractor 122 may be encoded in accordance with an H.264 or another standard. Meanwhile, the raw data extracted by the raw data extractor 122 may be formatted in BT.1120 which is a HDTV Studio Signal Interface standard published by International Telecommunication Union (ITU). In another example, however, the raw data may be formatted in BT.2073/BT.2077 which is a UHDTV Studio Signal Interface standard or another format.

The outbound data generation unit 140 may include a first picture data generator 144. The first picture data generator 144 receives the unidirectional picture data from the unidirectional data generator 124 and generates a first picture data by encoding the unidirectional picture data.

The first picture data generator 144 may include an encoder configured to encode the unidirectional picture data to generate the first picture data, a network interface configured to transmit the first picture data to the Internet client 600 through the Internet as the outbound data, an LED configured to indicate an operational state of the outbound data generation unit 140 or the first picture data generator 144, and a power unit configured to supply the power. Detailed description of these components will be omitted since they can readily be implemented based on this specification by those having ordinary skills in the art.

In an exemplary embodiment, the encoder of the first picture data generator 144 encodes the picture data in accordance with an MP4 or VP8 standard to facilitate streaming of an encoded picture data. In another embodiment, however, the picture data may be encoded in accordance with a H.264 or another standard.

The outbound data transmitted by the outbound data generation unit 140 can be played back by the Internet client 600. Here, the Internet client 600 may be a monitor, television, or wireless terminal accessing the video surveillance system through the external network.

As described above, in an exemplary embodiment of the present disclosure, the encoded raw data is transmitted unidirectionally to the Internet client 600 similarly to a broadcasting system in which a TV broadcast signal is transmitted by a broadcasting station to homes unidirectionally. As a result, at least one third-party person can watch the monitoring picture acquired by the monitoring camera 10 by accessing the video surveillance system through the external network.

In other words, similarly to the broadcast system in which the broadcast signal transmitted unidirectionally by the broadcasting station can be received at home and played back but any picture signal cannot be sent to the broadcasting station from home, the Internet client 600 can access the web server through the external network and receive the outbound picture data to play back the monitoring picture but is prohibited to access the monitoring camera 10 or the intranet through the Internet to transmit data to the monitoring camera 10 or the intranet.

The inbound data generation unit 160 may include a second picture data generator 164 and a picture storage 166. The second picture data generator 164 receives the unidirectional picture data from the unidirectional data generator 124 and generates a second picture data by encoding the unidirectional picture data. A coding scheme used for generating the second picture data in the second picture data generator 164 may be the same as or different from a coding scheme used for generating the first picture data in the first data generator 144. The picture storage 166 receives and temporarily stores the second picture data output by the second picture data generator 164 and provides the second picture data to the intranet client 700 as the inbound picture data in response to a request of the intranet client 700. Here, the picture storage 166 may be implemented by a network video recorder (NVR), for example.

The second picture data generator 164 may include an encoder configured to encode the unidirectional picture data to generate the second picture data, a LED configured to indicate an operational state of the inbound data generation unit 160 or the second picture data generator 164 and a power unit configured to supply the power. Detailed description of these components will be omitted since they can readily be implemented based on this specification by those having ordinary skills in the art.

The inbound picture data sent by the inbound data generation unit 160 can be played back by the intranet client 700. Here, the intranet client 700 may be a wired or wireless terminal that may be connected to the network separation device 100 through the internal network.

In FIG. 2, the picture storage 166 temporarily storing the inbound picture data may be optional and thus can be omitted in an alternative embodiment. In an embodiment where the picture storage 166 is not prepared, the second picture data output by the second picture data generator 164 may be provided to the intranet client 700 directly as the inbound picture data. In such a case, the raw data, the inbound picture data, or another type of picture data may be stored in another device inside or outside the network separation device 100 regardless of an output process of the inbound picture data.

On the other hand, in the embodiment shown in FIG. 2, the transmission of the picture data to the Internet client 600 or intranet client 700 is performed in response to the request from a corresponding client. If there is no request from the intranet client 700, the inbound picture data is not transmitted to the intranet client 700 but just may be stored in the picture storage 166.

As described above, while a process of generating the unidirectional data from the raw data is carried out for the outbound picture data sent through the external network, the inbound picture data that is sent through the internal network managed by a system operator is generated directly from the raw data without such a process.

The internal network may include an information processing system including business PCs and a business server. The information processing system may refer to a server computer that handles personal information or important business information in a corporate entity. For example, in case of an information and communications service provider operating a portal system, the information processing system may be a server system that performs various tasks of collecting, maintaining, processing, using, providing, managing, or destroying of the personal information. In case of a common corporate entity, the information processing system may be a system that handles important internal information. The information processing system may include a database management system configured systematically to support the processes handling the personal information, a server and various applications allowing accesses to the personal information database. Meanwhile, the business server may refer to a computer system that performs functions required to fulfill internal tasks. Even though just a single internal network is shown in FIG. 1, a plurality of internal networks may be used.

On the other hand, the control command checking unit 170 shown in FIG. 2 checks whether a control command or a request received from the external network client such as the Internet client conforms to a prescribed rule and is legitimate whenever the control command or the request is received from the external network client through the web server. In the system shown in FIGS. 1 and 2, all the control commands or requests received from the intranet client 700 to control the operation of the monitoring camera 10 may be performed normally. However, the network separation device 100 executes the control command or request received from the Internet client 600 in a limited scope. For example, the network separation device 100 may be set not to execute any command from the Internet client 600 that may be a hacking attempt or may be probable to damage the system while executing commands for fetching stored pictures or directing predetermined operations such as panning, tilting, or zooming of the monitoring camera 10. In a more strict embodiment, the network separation device 100 may execute no control command or request received from the Internet client 600. The control command checking unit 170 checks whether the control command received from the Internet client is allowable according to the prescribed rule, and then transfers allowed commands only to the monitoring camera 10 or a corresponding component of the network separation device 100 for execution.

The initialization unit 180 monitors whether data or a command received by the network separation device 100 through the external network is formatted in a protocol other than a predetermined protocol or whether the network separation device 100 shows another abnormal state, and initializes and clears firmware of the network separation device 100 when the abnormal state occurs. For example, in case that at least one device of the video surveillance system is taken by a hacker in a hacking trial through the external network, some data formatted in a protocol other than the predetermined protocol may be received through the device taken by the hacker. In such a case, the initialization unit 180 may issue an alarm to the external network through which the hacker intruded and/or the internal network and forces the initialization of the network separation device 100 or software of the attacked device.

Figure 3:
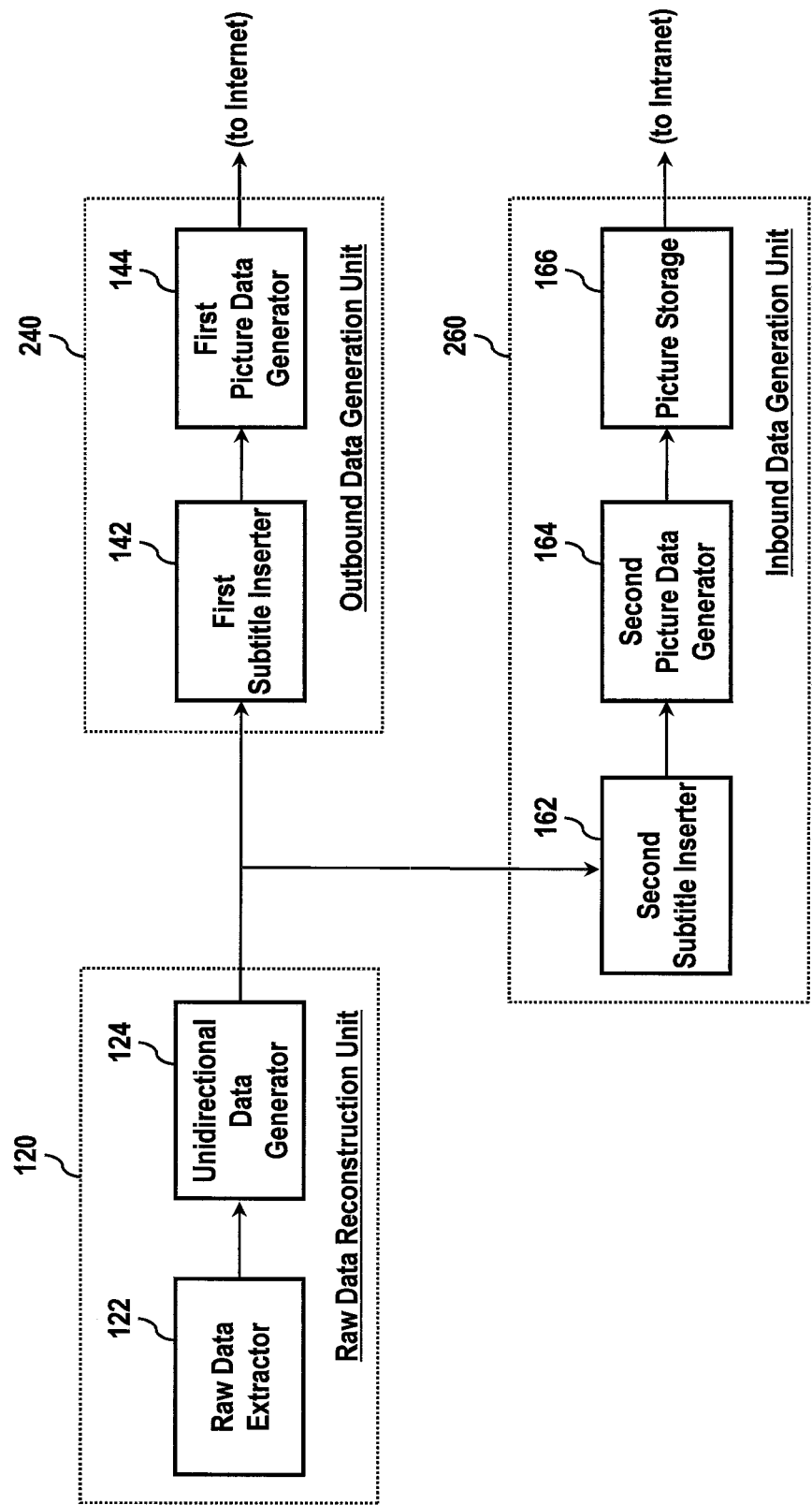
FIG. 3 is a block diagram of the network separation device shown in FIG. 1 according to another embodiment of the present disclosure.

FIG. 3 shows another embodiment of the network separation device 100. The network separation device 100 shown in FIG. 3 includes the raw data reconstruction unit 120, an outbound data generation unit 240, and an inbound data generation unit 260.

In the outbound data generation unit 240, a first subtitle inserter 142 receives the unidirectional picture data from the unidirectional data generator 124 and inserts a subtitle into a unidirectional picture corresponding to the unidirectional picture data. The first picture data generator 144 generates the first picture data by receiving and encoding the unidirectional picture data where the subtitle is inserted.

In the inbound data generation unit 260, a second subtitle inserter 162 receives the raw data from the unidirectional data generator 124 and inserts a subtitle into the unidirectional picture corresponding to the unidirectional picture data. The second picture data generator 164 generates the second picture data by receiving and encoding the raw data where the subtitle is inserted.

The subtitles inserted into the pictures by the first and second subtitle inserters 142 and 162 may include at least one of: identification information of the monitoring camera 10 that acquired the picture, a monitored object, positional information of the monitoring camera 10 and/or the monitored object, and a subject managing the monitoring camera 10. Also, the subtitles may include one or both of a text including a letter or a number, and an image including a symbol or a shape design.

Accordingly, a third party person using the Internet client 600 or an administrator using the intranet client 700 can obtain information, from the subtitle included in the picture, of the camera having acquired the picture, the monitored object, and the location of the camera or the object. For example, the subtitles may include a name and logo of a local government that manages the monitored area as well as an address and name of monitored area.

Here, if there is any information that needs not to be provided or should not be disclosed to the third party client accessing through the external network, the first and second subtitle inserters 142 and 162 may insert different subtitles into the outbound picture and inbound picture. In other words, the subtitle inserted into the outbound picture by the first subtitle inserter 142 may contain a content different from that of the subtitle inserted into the inbound picture by the second subtitle inserter 162.

For example, information on a failure detected in the monitoring camera 10 or information on a location movement of a tracking object may be stored in the picture storage 166 or inserted as a subtitle only into the inbound picture played back in the intranet client 700 for allowing the administrator to recognize the information. However, such information may be omitted in the subtitle included in the outbound picture played in the Internet client 600 or another subtitle may be inserted into the outbound picture so that the third party person accessing through the external network cannot acquire the information.

On the other hand, in an embodiment where the subtitle inserted into the outbound picture by the first subtitle inserter 142 is the same as the subtitle inserted into the inbound picture by the second subtitle inserter 162, one of the first and second subtitle inserters 142 and 162 may be incorporated into a single subtitle inserter that inserts the subtitle into two pictures.

The other configuration and operational features of the device shown in FIG. 3 are the same as or similar to those of the device shown in FIG. 2, and thus detailed descriptions thereof will be omitted.

In the embodiments of FIGS. 2 and 3, the outbound picture data and the inbound picture data may be streamed to the Internet client and the intranet client, respectively, by the outbound data generation unit 140 or 240 and the inbound data generation unit 160 or 260, respectively. On the other hand, a standard for streaming the outbound picture data may be the same as or different from a standard for streaming the inbound picture data, which is described with a reference to FIG. 4.

Figure 4:
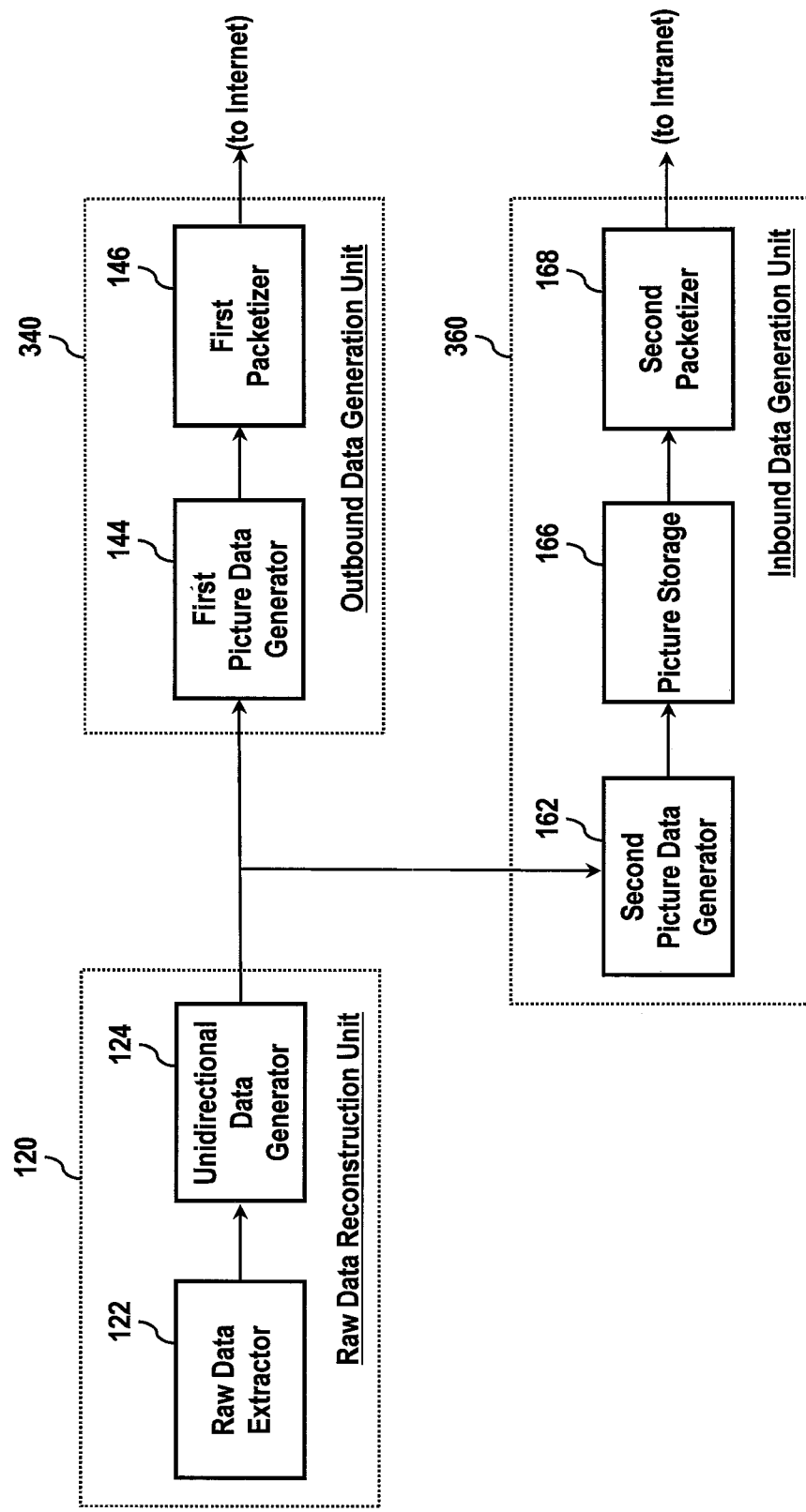
FIG. 4 is a block diagram of the network separation device shown in FIG. 1 according to yet another embodiment of the present disclosure.

FIG. 4 shows yet another embodiment of the network separation device 100. The network separation device 100 shown in FIG. 4 includes the raw data reconstruction unit 120, an outbound data generation unit 340, and an inbound data generation unit 360.

In the outbound data generation unit 340, a first packetizer 146 generates packets of the outbound picture data (i.e., the first picture data) in accordance with the first streaming specification and transmits them to the Internet client 600 using the streaming method.

In the inbound data generation unit 360, a second packetizer 168 packetizes the inbound picture data (i.e., the second picture data) to deliver to the intranet client 700 by streaming in accordance with a second streaming standard.

The second streaming standard used for transmitting the picture data to the internal network client may be Real Time Streaming Protocol (RTSP) which was published by Internet Engineering Task Force (IETF) and chosen to use for video transmission in Open Network Video Interface Forum (ON-VIF) protocol published by the ONVIF as a communication standard between video surveillance devices.

In one embodiment, the first streaming standard used for transmitting the picture data to the external network client may be the RTSP also.

In another embodiment, however, Real Time Messaging Protocol (RTMP) that is used in the Adobe Flash Player (trademark of Adobe Inc.) may be employed as the first streaming standard. In the other embodiment, an adaptive streaming technology, e.g. HTTP Live Streaming proposed by Apple Inc. may be employed as the first streaming standard.

In other words, the RTSP which is the most widely used streaming standard when the present application is being filed may be used as the first and second streaming standards. However, the HTTP Live Streaming which is suitable for use without a separate plug-in in the HTML5, a next generation HTML, may be used as the second streaming standard. Since the monitoring picture generally needs no modification, the HTTP Live Streaming may be used to deliver the monitoring picture data with little interruption or buffering while reducing the load of a server or client side.

On the other hand, even though it was described above that the first and second packetizers 146 and 168 packetizes the outbound picture data and the inbound packet data to deliver to the clients by streaming in accordance with the first and second streaming standards, the data received by the network separation device 100 may be packetized already in accordance with the first streaming standard. In such a case, the raw data reconstruction unit 120 may receive and depacketize the monitoring picture data, and the first and second packetizers 146 and 168 may packetize depacketized picture data again. According to this embodiment, the protocol to be applied for streaming of the outbound picture data may be converted by the first packetizer 146. Further, the second packetizer 168 may be omitted and removed from the network separation device 100.

The system in which the first streaming standards is different from the second streaming standard is advantageous in that the streaming of the outbound picture data transmitted through the external network is simple while allowing a modification or processing of the inbound picture data transmitted through the internal network.

The other configuration and operational features of the device shown in FIG. 4 are the same as or similar to those of the device shown in FIG. 2, and thus detailed descriptions thereof will be omitted.

Figure 5:
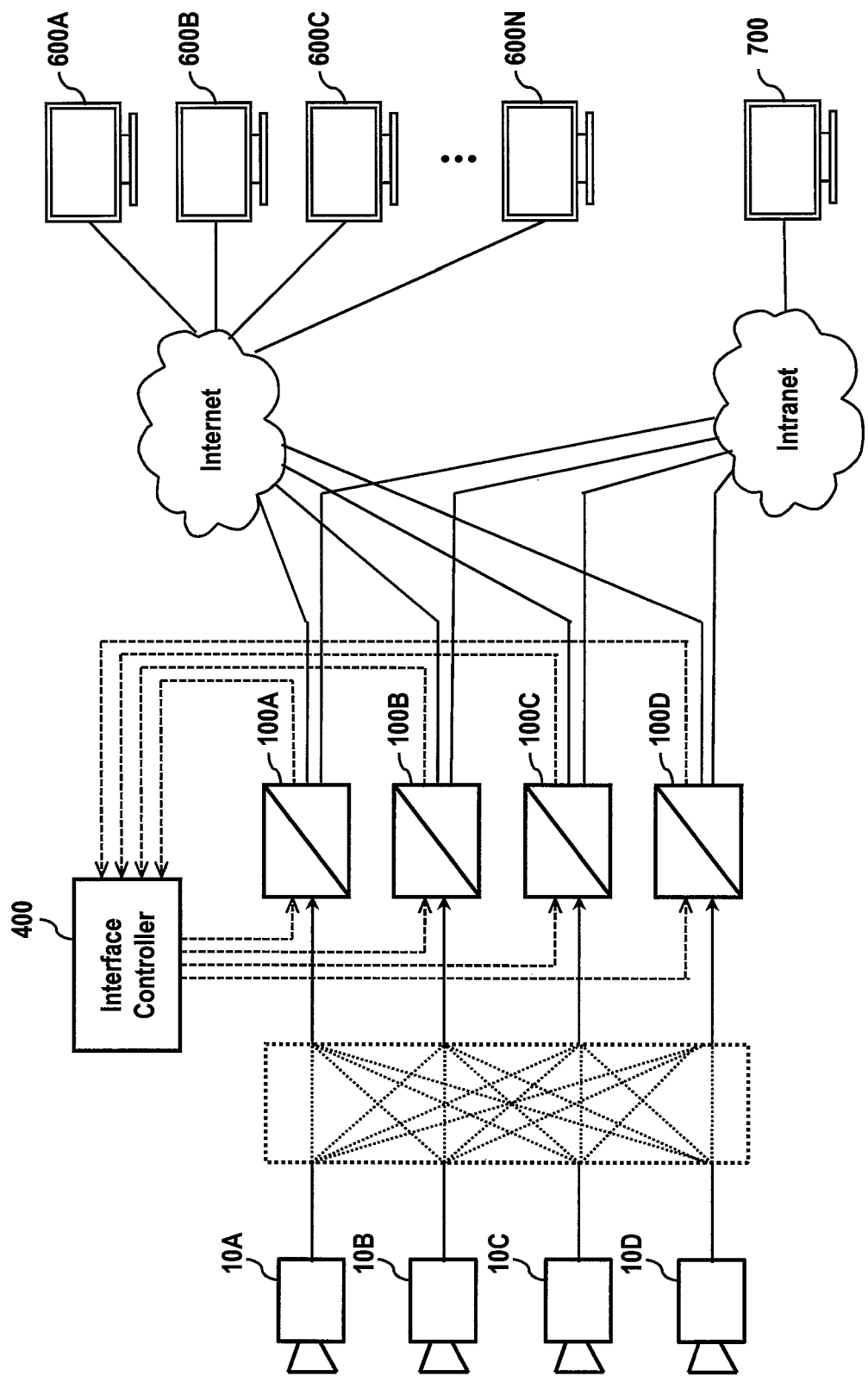
FIG. 5 is a block diagram of the video surveillance system according to another exemplary embodiment of the present disclosure.

FIG. 5 shows a video surveillance system according to another embodiment of the present disclosure. The video surveillance system according to present embodiment includes a plurality of monitoring cameras 10A-10D and a plurality of network separation devices 100A-100D and is capable of providing monitoring pictures acquired by the monitoring cameras 100A-100D to a plurality of Internet clients 600A-600N through the external network such as the Internet while providing the monitoring pictures to at least one intranet client 700 through the intranet. Also, the video surveillance system may further include an interface control device 400 to balance traffic among the plurality of network separation devices 100A-100D.

In a preferred embodiment, each of the plurality of network separation devices 100A-100D is mapped to at least one of the plurality of monitoring cameras 10A-10D. The mapping between the network separation devices 100A-100D and the monitoring cameras 10A-10D may be constructed by a default mapping according to an initial setting, and may be changed according to a load of each of the plurality of network separation devices 100A-100D.

When a user of one of the Internet clients 600A-600N wishes to check a monitoring picture acquired by one of the plurality of monitoring cameras 10A-10D, a corresponding Internet client 600A-600N may request the monitoring picture acquired by the corresponding camera through the web server, which analyzes a parameter included in the request to determine a camera associated with the request and requests the monitoring picture to the network separation device mapped to a determined camera. Upon receiving the request, the network separation device provides the monitoring picture data as the outbound picture data by streaming according to the procedure described above.

All or some of the plurality of network separation devices 100A-100D can detect picture data traffic handled by the device. The interface control device 400 receives the traffic information from each network separation device 100A-100D and adjusts a mapping relationship between the network separation devices 100A-100D and the monitoring cameras 10A-10D based on the traffic of each network separation device 100A-100D. When the mapping relationship is to be adjusted, the interface control device 400 issues an input channel change command to a relevant network separation device.

For example, it is assumed that the monitoring cameras 10A-10D are mapped to the network separation devices 100A-100C, respectively, and there is a high demand for the monitoring picture from the monitoring camera 10A and thus the load of the network separation device 100A is high while there is low demands for the monitoring pictures from the monitoring cameras 10B and 10C and thus the load of the network separation devices 100B and 100C are low. In such a case, the interface control device 400 may adjust the mapping relationship based on the load information of the network separation devices 100A-100C such that the monitoring camera 10A is mapped to two network separation devices 100A and 100B while two monitoring cameras 10B and 10C are mapped to the network separation device 100C. Accordingly, some of the load applied to the network separation device 100A can be distributed to the network separation device 100B.

Figure 6:
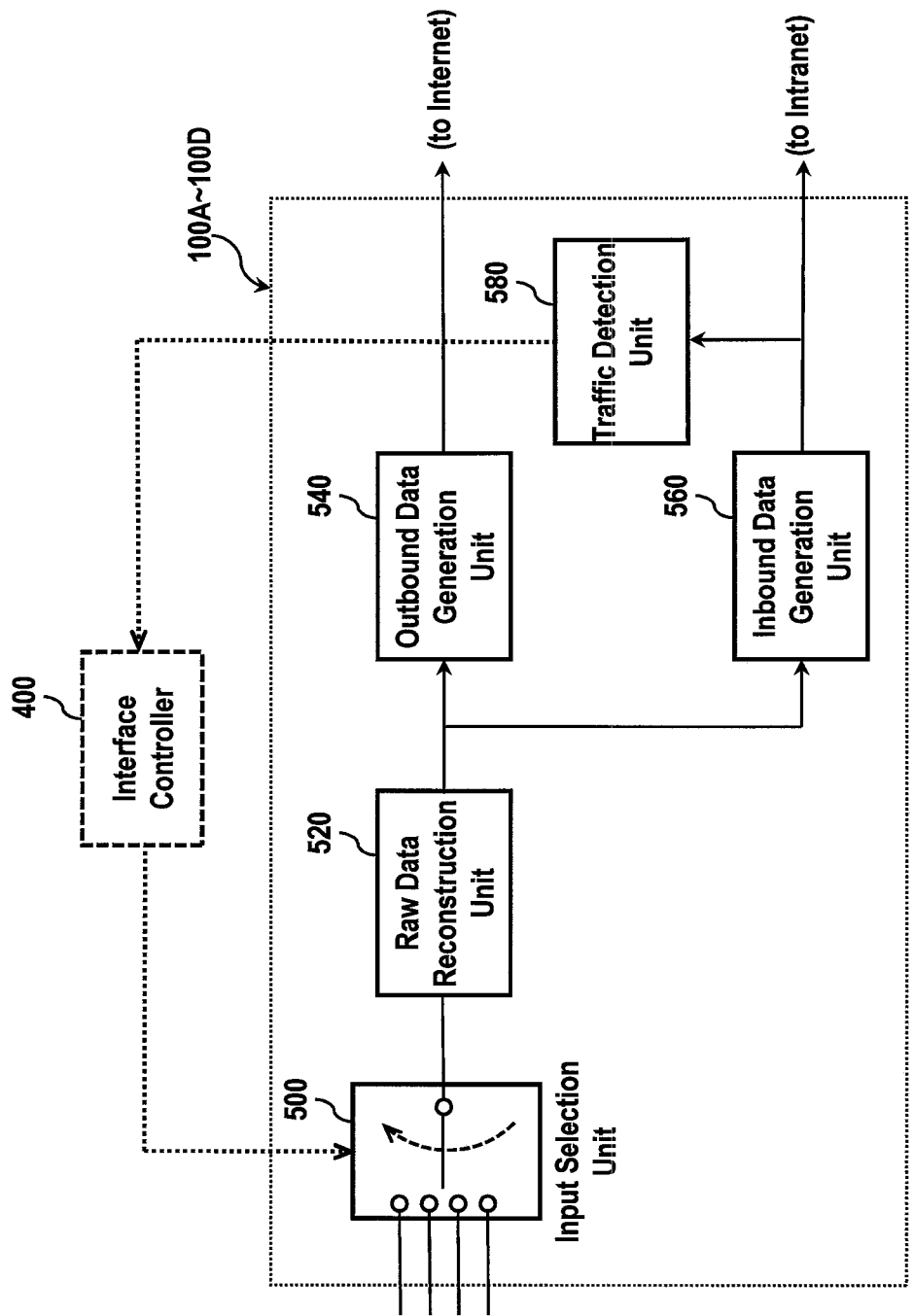
FIG. 6 is a block diagram of the network separation device shown in FIG. 5 according to an embodiment of the present disclosure.

FIG. 6 shows an embodiment of the network separation devices 100A-100D shown in FIG. 5. In the present embodiment, each of the network separation devices 100A-100D includes a raw data reconstruction unit 520, an outbound data generation unit 540, an inbound data generation unit 560, a traffic detection unit 580, and an input selection unit 500.

The traffic detection unit 580 may detect outbound traffic of the network separation device 100A-100D. Here, the term "traffic" is used to refer to a quantity or bandwidth of data being transmitted or a number of users connected to the system. The traffic detection unit 580 outputs detected traffic information to the interface control device 400, so that the interface control device 400 can adjust the mapping relationship between the network separation devices 100A-100D and monitoring cameras 10A-10D.

The input selection unit 500 changes a monitoring camera mapped to the network separation device to receive the monitoring picture data into another camera in response to the input channel change command from the interface control device 400.

Even though it is shown in FIG. 5 that the interface control device 400 is provided separately and independently from the network separation devices 100A-100D, the interface control device 400 may be provided in each of the network separation devices 100A-100D in an alternative embodiment. In such an embodiment, the interface control devices 400 in the network separation devices 100A-100D preferably communicate with each other under a control of a separate controller or regardless of such a controller.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

For example, it was described that a real-time monitoring picture acquired by the monitoring camera 10 is provided to the external network client, i.e. the Internet client 600, and the internal network client, i.e., intranet client 700, the network separation device may provide the picture stored in the picture storage such as the NVR to the external network client and/or the internal network client in an alternative embodiment.

Meanwhile, although various embodiments were described above, any embodiment may employ the configuration or operational features of the device or the system according to another embodiment by replacing or in combination with its own configuration. For example, the control command checking unit 170 and the initialization unit 180 shown only in FIG. 2 may be employed in the other embodiments.

On the other hand, although it was described above that the control command checking unit 170 is a part of the network separation device 100, the control command checking unit 170 may provided outside of the network separation device 100, for example, in the web server.

While one or more exemplary embodiments have been described with reference to the figures, it will be understood by those of ordinary skill in the art that various changes in form and details may be made therein without departing from the spirit and scope as defined by the following claims.

The invention claimed is:

1. A method of providing surveillance pictures in a network separation device of a video surveillance system transmitting outbound picture data corresponding to a monitoring picture and packetized according to a first streaming scheme unidirectionally to an external network client through an external network in response to a request of the external network client and transmitting inbound picture data to an internal network client through an internal network in response to another request from of the internal network client, comprising:
   receiving monitoring picture data acquired by a monitoring camera in a form of a stream in which the monitoring picture data is packetized according to a second streaming scheme;
   extracting raw picture data from the monitoring picture data;
   generating unidirectional data by controlling a data flow of the raw picture data such that the raw picture data is transferred in one predetermined direction only;
   generating the outbound picture data by encoding the unidirectional data according to a first coding scheme;
   generating the inbound picture data by encoding the unidirectional data according to a second coding scheme;
   packetizing the outbound picture data according to the first streaming scheme to transmit to the external network client by streaming, whereby the network separation data changes a streaming scheme of the monitoring picture data from the second streaming scheme to the first streaming scheme for the outbound picture data; and
   packetizing the inbound picture data according to the second streaming scheme to transmit to the internal network client by streaming.

2. The method of claim 1, wherein generating the outbound picture data includes inserting a first subtitle into an outbound picture corresponding to the outbound picture data and inserting a second subtitle into an inbound picture corresponding to the inbound picture data.

3. The method claim 1, wherein the first coding scheme is the same as the second coding scheme.

4. The method of claim 1, wherein the method further includes:
   detecting an outbound traffic that increases with a number of the external network clients receiving the outbound picture data,
   wherein the network separation device interfaces to a monitoring camera selected from a plurality of monitoring cameras, and
   wherein the selected camera is subject to a change according to the outbound traffic.

5. The method claim 4, further comprising:
   changing the monitoring camera according to the outbound traffic.

6. The method of claim 1, further comprising:
checking a command received from the external network client to allow the command to be executed only when the command conforms to a prescribed rule.

7. The method of claim 6, further comprising:
initializing and clearing the network separation device when a predetermined abnormal state occurs in the video surveillance system.

\* \* \* \* \*